United States Patent [19]

Blanchard

[11] Patent Number: 4,938,453
[45] Date of Patent: Jul. 3, 1990

[54] SPRING-LOADED BALL VALVE FOR CONTROLLING THE FLOW OF FLUID THERETHROUGH

[76] Inventor: Joseph N. G. Blanchard, General Delivery, Rollyview, Alberta, Canada, POC 2KO

[21] Appl. No.: 432,097

[22] Filed: Nov. 6, 1989

[51] Int. Cl.$^5$ .............................................. F16K 5/06
[52] U.S. Cl. ...................................... 251/313; 251/315
[58] Field of Search ........................ 251/304, 313, 315

[56] References Cited

U.S. PATENT DOCUMENTS

| | | |
|---|---|---|
| 597,906 | 1/1898 | Huett . |
| 791,238 | 5/1905 | Baker . |
| 988,689 | 4/1911 | Bordo . |
| 1,223,353 | 4/1917 | Angell . |
| 1,434,832 | 11/1922 | Long et al. . |
| 1,499,446 | 7/1924 | Code . |
| 1,631,166 | 6/1927 | Sprague . |
| 1,814,045 | 7/1931 | Kay . |
| 1,929,694 | 10/1933 | Judson, Jr. ............................ 137/34 |
| 2,505,145 | 4/1950 | Ryan ................................... 251/149 |
| 2,609,870 | 9/1952 | Riebman et al. ..................... 158/111 |
| 2,777,426 | 1/1957 | Steele .................................. 121/46.5 |
| 2,925,095 | 2/1960 | Bates ................................ 137/625.43 |
| 3,382,733 | 5/1968 | Miller et al. ........................... 74/543 |
| 3,964,728 | 6/1976 | Flider .................................... 251/183 |
| 4,270,849 | 6/1981 | Kalbfleisch ........................... 251/292 |
| 4,579,017 | 4/1986 | Nusser ................................... 74/519 |
| 4,779,840 | 10/1988 | Andrea ................................ 251/174 |

*Primary Examiner*—John C. Fox
*Attorney, Agent, or Firm*—Panitch Schwarze Jacobs & Nadel

[57] ABSTRACT

A spring-loaded ball valve for controlling the flow of fluid therethrough. The ball valve includes a housing having a longitudinal conduit extending completely therethrough along its longitudinal axis for allowing fluid to flow therethrough. A ball headed member is positioned within the longitudinal conduit and includes an aperture extending completely through the ball headed member for controlling the flow of fluid through the longitudinal conduit. A stem portion is connected to the ball headed member and is coupled to a handle member for moving the ball headed member between an open position wherein the ball headed member aperture is generally aligned with the longitudinal conduit for allowing fluid to flow therethrough and a closed position wherein the ball headed member aperture is not aligned with the longitudinal conduit for preventing fluid from flowing therethrough. The handle member extends outwardly from the stem portion toward a first lateral side of the longitudinal conduit. A stop member is positioned on the first lateral side of the housing. An elongated mounting member is positioned on the second lateral side of the housing. The mounting member secures a biasing member to the housing such that it engages the stop member and the elongated handle for biasing the elongated handle towards the closed position.

7 Claims, 1 Drawing Sheet 4,938,453

SPRING-LOADED BALL VALVE FOR CONTROLLING THE FLOW OF FLUID THERETHROUGH

FIELD OF THE INVENTION

The present invention relates to valves for fluids and, more particularly, to a spring-loaded ball valve for controlling the flow of fluid therethrough.

BACKGROUND OF THE INVENTION

In the spring-loaded ball valve field, there exists a need for an inexpensive and reliable spring-loaded ball valve. This is particularly true because conventional spring-loaded ball valves require numerous parts, thereby requiring substantial assembly time and increasing manufacturing costs. Consequently, there exists a need for a spring-loaded ball valve which is comprised of a relatively small number of relatively simple or off-the-shelf (existing) parts for reducing manufacturing costs without sacrificing the quality of the ball valve.

The present invention provides a spring-loaded ball valve for controlling the flow of fluid therethrough. The ball valve is constructed of a relatively small number of simple parts, some of which are readily available off the shelf, for limiting manufacturing costs. More particularly, the ball valve is spring loaded by essentially using a pair of screws and a coil spring. Thus, the ball valve of the present invention results in considerable savings in money, as well as time, for manufacturing the ball valve.

SUMMARY OF THE INVENTION

Briefly stated, the present invention comprises a spring-loaded ball valve for controlling the flow of fluid therethrough. The ball valve comprises a housing having a longitudinal axis. The housing has a longitudinal conduit extending completely therethrough along the longitudinal axis for allowing fluid to flow therethrough. The housing further has a housing aperture extending through at least a portion of the housing perpendicular to and intersecting the longitudinal conduit. A ball headed member is positioned within the longitudinal conduit and includes an aperture extending completely through the ball headed member for controlling the flow of fluid through the longitudinal conduit. The ball headed member has a stem portion integral therewith which extends through the housing aperture beyond the housing. An elongated handle member is coupled to the stem portion for moving the ball headed member between an open position wherein the ball headed member aperture is generally aligned with the longitudinal conduit for allowing fluid to flow therethrough, and a closed position wherein the ball headed member aperture is not aligned with the longitudinal conduit for preventing fluid from flowing therethrough. The elongated handle member extends outwardly from the stem portion toward a first lateral side of the longitudinal axis. A stop member is positioned on the first lateral side of the housing. An elongated mounting member is positioned on the housing on a second lateral side of the longitudinal axis. A biasing member is provided having a body portion, a first terminal end extending from one end of the body portion, and a second terminal end extending from another end of the body portion. The mounting member secures the biasing member to the housing with the first terminal end in engagement with the stop member and the second terminal end in sliding engagement with the handle member, whereby the biasing member biases the handle toward the closed position, and as the handle member moves toward the open position the second terminal end of the biasing member slides therealong.

BRIEF DESCRIPTION OF THE DRAWING

The foregoing summary, as well as the following detailed description of the preferred embodiment, is better understood when read in conjunction with the appended drawing. For the purpose of illustrating the invention, there is shown in the drawing an embodiment which is presently preferred, it being understood, however, that the invention is not limited to the specific methods and instrumentalities disclosed. In the drawing.

DESCRIPTION OF PREFERRED EMBODIMENT

Figure 1:
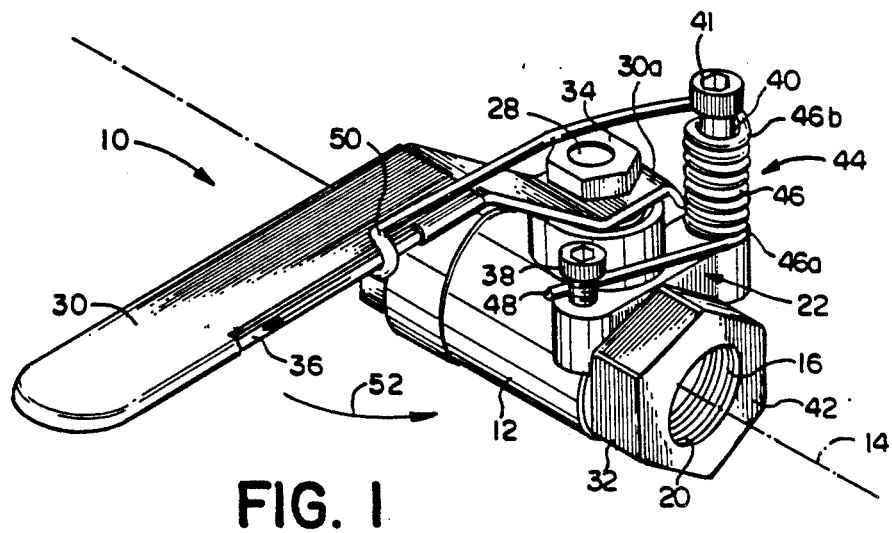
FIG. 1 is a perspective view of a spring-loaded ball valve for controlling the flow of fluid therethrough in accordance with the present invention.

Certain terminology is used in the following description for convenience only and is not limiting. The words "right," "left," "lower" and "upper" designate directions in the drawing to which reference is made. The words "inwardly" and "outwardly" refer to directions toward and away from, respectively, the geometric center of the spring-loaded ball valve and designated parts thereof. The terminology includes the words above specifically mentioned, derivatives thereof and words of similar import.

Figure 2:
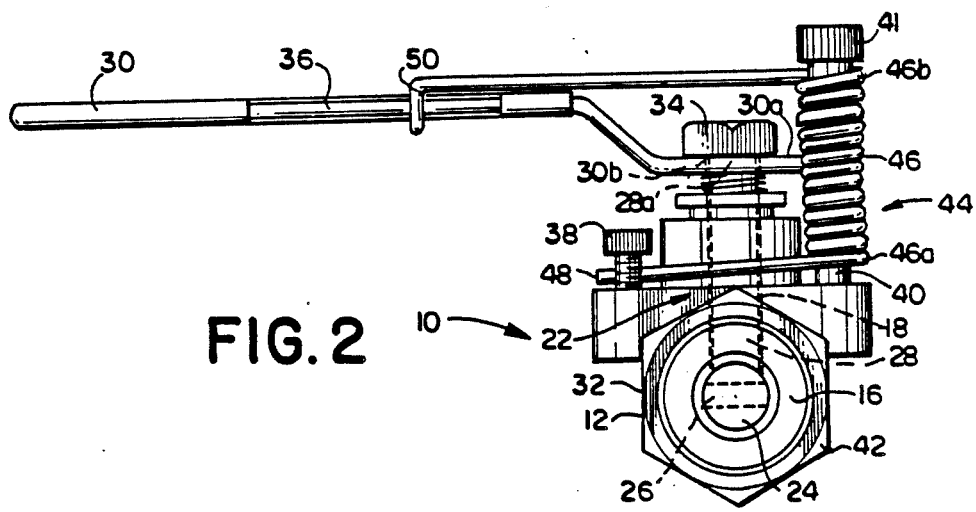
FIG. 2 is a front elevational view of the spring-loaded ball valve of FIG. 1.

Referring to the drawings in detail, wherein like numerals indicate like elements throughout, there is shown in FIGS. 1 and 2 a preferred embodiment of a spring-loaded ball valve, generally designated 10, for controlling the flow of fluid therethrough in accordance with the present invention.

Referring now to FIG. 1, there is shown a housing 12 having a longitudinal axis 14. The housing 12 preferably includes a generally longitudinal conduit 16 extending completely therethrough along the longitudinal axis 14 for allowing fluid to flow therethrough. As shown in FIG. 2, the housing 12 further preferably includes a housing aperture 18 extending through at least a portion of the housing 12 generally perpendicular to and intersecting the longitudinal conduit 16.

In the present embodiment, it is preferred that the longitudinal conduit 16 include internal threads 20 at each end thereof for threadably receiving a conduit or coupling member therein, as is understood by those skilled in the art. However, it is understood by those skilled in the art that other means could be used for coupling the ball valve 10 to other conduits, such as welding. Preferably, the housing 12 includes shoulder or structural areas 22 for receiving hardware or the like, as described in more detail hereinafter.

In the present embodiment, it is preferred that the housing 12 be constructed of a high strength, cast metallic material, such as iron. However, it is understood by those skilled in the art that the housing 12 could be milled or cast of other similar high strength metallic materials, such as steel or brass or some type of metal alloy.

Referring now to FIG. 2, a ball headed member 24 is positioned within the longitudinal conduit 16 and includes an aperture 26 extending completely through the ball headed member 24 for controlling the flow of fluid through the longitudinal conduit 16. Preferably, the aperture 26 is large enough that it does not unduly restrict fluid flow through the longitudinal conduit 16 when the valve 10 is in the open position as hereinafter described. The ball headed member 24 has a stem portion 28 integral therewith and extending through the housing aperture 18 and beyond the outer surface of the housing 12. In the present embodiment, it is preferred that the stem portion 28 be suitably sized to generally correspond to the housing aperture 18 with a tight fit for allowing the stem portion 28 to rotate therewithin, but yet preventing the flow of fluid between the housing aperture 18 and the stem portion 28. A sealing or packing material may also be employed if desired.

In the presently preferred embodiment, the ball headed member 24 and the stem portion 28 are of one-piece construction. More particularly, it is preferred that the ball headed member 24 and the stem portion 28 be constructed of high strength metallic material, such as steel or some other metal or alloy.

Referring now to FIG. 1, an elongated handle member 30 is coupled or fixed to the stem portion 28 near its distal end for moving the ball headed member 24 between an open position (not shown) wherein the ball headed member aperture 26 is generally axially aligned with the longitudinal conduit 16 for allowing fluid to flow therethrough and a closed position (see FIG. 2) wherein the ball headed member aperture 26 is not axially aligned with the longitudinal conduit 16 and extends generally perpendicular to the longitudinal conduit 16 for preventing fluid from flowing therethrough. Consequently, the ball headed member 24 is sized to complement the longitudinal conduit 16 for preventing fluid from passing through the longitudinal conduit 16 when the elongated handle member 30 is in the closed position shown in the Figures.

As shown in FIG. 2, in the present embodiment, it is preferred that the elongated handle member 30 extend generally perpendicularly outwardly from the stem portion 28 toward a first lateral side 32 of the longitudinal axis 14. Preferably, the elongated handle member 30 includes a first end 30a having a mounting hole 30b therein. The stem portion 28 preferably includes a mounting portion 28a which extends through the mounting hole 30b. Preferably, the mounting portion 28a and mounting hole 30b are correspondingly shaped to prevent the stem portion 28 from rotating with respect to the handle member 30.

In the present embodiment, it is preferred that a nut 34 be threadably secured to the mounting portion 28a for maintaining the elongated handle member 30 thereon. However, it is understood by those skilled in the art that other means could be used to secure the handle member 30 to stem portion 28, such as a washer-like clip, friction or welding. Alternatively, the handle member 30 may be removable from the stem portion 28.

In the present embodiment, it is preferred that the elongated handle member 30 be constructed of a high strength, lightweight metallic material, such as aluminum. However, it is understood by those skilled in the art, that the elongated handle member 30 can be constructed of other high strength metallic or polymeric materials, such as steel, brass or polyvinylchloride or of a metal alloy.

In the presently preferred embodiment, the outwardly extending or gripping portion of the elongated handle member 30 includes a polymeric coating for allowing the elongated handle member 30 to be easily gripped. However, an area 36 of the elongated handle member 30 is not covered with the polymeric coating, for reasons discussed in detail hereinafter. In the present embodiment, it is preferred that the polymeric coating be comprised of a polyurethane or other similar material. However, it is appreciated by those skilled in the art that other polymeric materials can be utilized for coating the elongated handle member 30.

As shown in FIGS. 1 and 2, a stop member 38 is preferably positioned on the first lateral side 32 of the housing 12 on the structural areas 22. In the present embodiment, it is preferred that the stop member 38 be a metallic set screw threadably secured to the housing 12. However, it is understood by those skilled in the art, that other instrumentalities can be used to accomplish the same function as the stop member 38. For instance, the stop member 38 could be cast directly into the housing 12 to thereby eliminate the need for an additional part.

Referring now to FIG. 2, an elongated mounting member 40 is positioned on the structural areas 22 of the housing 12 on a second lateral side 42 of the longitudinal axis 14. Preferably, the elongated mounting member 40 extends from the housing 12 generally parallel to the housing aperture 18.

In the present embodiment, it is preferred that the elongated mounting member 40 be a shoulder screw threadably secured to the housing 12. However, it is understood by those skilled in the art, that other structures could be used, such as a metallic dowel-like pin frictionally secured within an aperture (not shown) in the housing 12.

Referring now to FIGS. 1 and 2, a biasing member 44 is provided, having a body portion 46, a first terminal end 48 extending from one end 46a of the body portion 46 and a second terminal end 50 extending from another end 46b of the body portion 46. The elongated mounting member 40 secures the biasing member 44 to the housing 12 with the first terminal end 48 in engagement with the stop member 38 and the second terminal end 50 in sliding engagement with the handle member 30.

Consequently, the biasing member 44 biases the handle 30 toward the closed position, and as the handle member 30 moves toward the open position (as designated by the arrow 52), the second terminal end 50 of the biasing member 44 slides along the uncoated area 36. The area 36 preferably has a coefficient of friction less than the polymeric coating for allowing the handle member 30 to be readily rotated with consequent movement of the second terminal end 50 of the biasing member 44 as described.

In the present embodiment, it is preferred that the biasing member 44 be a coil spring and the body portion 46 be a coil portion wherein the coil spring is positioned over the mounting member 40 such that the mounting member 40 extends through the coil portion. Specifically, the coil portion of the coil spring has a predetermined outer diameter and the elongated mounting member 40 is a generally cylindrical member or shoulder screw having a generally cylindrical head portion 41 with an outer diameter greater than the outer diameter of the coil portion for securing the coil spring to the housing 12. Preferably, the coil spring is under an initial tension when installed as shown, such that a biasing force is applied by the coil spring upon the handle member 30 to maintain the valve 10 in a closed position in the absence of a contervailing force which overcomes the coil spring bias to move the valve to the open condition.

It is understood by those skilled in the art that the present invention is not limited to the specific coil spring shown and that other similar springs could be used to bias the handle member 30 towards the closed position.

As is apparent from the description above, the spring-loaded ball valve 10 of the present invention includes an open position wherein fluid can pass through the longitudinal conduit 16 and a closed position wherein fluid cannot pass through the longitudinal conduit 16. The elongated handle member 30 is biased toward the closed position by the biasing member 44. The means for biasing the elongated handle member 30 towards the closed position is simple and inexpensive to manufacture.

From the foregoing description, it can be seen that the present invention comprises a spring-loaded ball valve for controlling the flow of fluid therethrough. It is recognized by those skilled in the art that changes may be made to the above-described embodiment of the invention without departing from the broad inventive concept thereof. It is understood, therefore, that this invention is not limited to the particular embodiment disclosed, but is intended to cover all modifications which are within the spirit and scope of the invention as defined by the appended claims.

I claim:

1. A spring-loaded ball valve for controlling the flow of fluid therethrough, said ball valve comprising:
   a housing having a longitudinal axis, said housing having a longitudinal conduit extending completely therethrough along said longitudinal axis for allowing fluid to flow therethrough, said housing further having a housing aperture extending through at least a portion of said housing perpendicular to and intersecting said longitudinal conduit;
   a ball headed member positioned within said longitudinal conduit and including an aperture extending completely through the ball headed member for controlling said flow of fluid through said longitudinal conduit, said ball headed member having a stem portion integral therewith and extending through said housing aperture beyond said housing;
   an elongated handle member coupled to said stem portion for moving said ball headed member between an open position wherein said ball headed aperture is generally aligned with said longitudinal conduit for allowing fluid to flow therethrough and a closed position wherein said ball headed aperture is not aligned with said longitudinal conduit for preventing fluid from flowing therethrough, said elongated handle member extending outwardly from said stem portion toward a first lateral side of said longitudinal axis;
   a stop member positioned on said first lateral side of said housing;
   an elongated mounting member positioned on said housing on a second lateral side of said longitudinal axis; and
   a biasing member having a body portion, a first terminal end extending from one end of said body portion and a second terminal end extending from another end of said body portion, said mounting member securing the biasing member to the housing with said first terminal end in engagement with said stop member and said second terminal end in sliding engagement with said handle member whereby said biasing member biases said handle member toward said closed position and as said handle member moves toward said open position said second terminal end of said biasing member slides therealong.

2. The spring-loaded ball valve as recited in claim 1, wherein said biasing member is a coil spring and said body portion is a coil portion.

3. The spring-loaded ball valve as recited in claim 2, wherein said coil spring is positioned over said mounting member such that said mounting member extends through said coil portion.

4. The spring-loaded ball valve as recited in claim 1 wherein said elongated mounting member extends from said housing generally parallel to said housing aperture.

5. The spring-loaded ball valve as recited in claim 4, wherein the coil portion of said coil spring has a predetermined outer diameter and said elongated mounting member is a generally cylindrical member having a generally cylindrical head portion with an outer diameter greater than the outer diameter of said coil portion for securing said coil spring to said housing.

6. The spring-loaded ball valve as recited in claim 1, wherein said stop member is a set screw threadably secured to said housing.

7. The spring-loaded ball valve as recited in claim 1, wherein said handle is constructed of a metallic material having a polymeric coating except for an area where the second terminal end of said biasing member engages said handle member.

* * * * *